(12) United States Patent
Toebben

(10) Patent No.: US 11,989,692 B2
(45) Date of Patent: May 21, 2024

(54) REVISION CONTROL FOR PRODUCT MASTER DATA IN PRODUCT LIFECYCLE MANAGEMENT

(71) Applicant: SAP SE, Walldorf (DE)

(72) Inventor: Stephan Toebben, Walldorf (DE)

(73) Assignee: SAP SE, Walldorf (DE)

( * ) Notice: Subject to any disclaimer, the term of this patent is extended or adjusted under 35 U.S.C. 154(b) by 379 days.

(21) Appl. No.: 17/497,215

(22) Filed: Oct. 8, 2021

(65) Prior Publication Data

US 2023/0111877 A1    Apr. 13, 2023

(51) Int. Cl.
*G06Q 10/0875* (2023.01)
*G06Q 10/10* (2023.01)

(52) U.S. Cl.
CPC .......... *G06Q 10/0875* (2013.01); *G06Q 10/10* (2013.01)

(58) Field of Classification Search
CPC .................. G06Q 10/0875; G06Q 10/10
See application file for complete search history.

(56) References Cited

U.S. PATENT DOCUMENTS

| 11,263,003 | B1* | 3/2022 | Gan | G06F 16/219 |
| 2011/0246256 | A1* | 10/2011 | Zhu | G06Q 10/06313 |
| | | | | 707/769 |
| 2014/0364985 | A1* | 12/2014 | Tiwari | G06Q 10/0875 |
| | | | | 700/107 |
| 2018/0081905 | A1* | 3/2018 | Kamath | G06F 16/287 |
| 2021/0049711 | A1* | 2/2021 | Chen | G06Q 30/0185 |

* cited by examiner

*Primary Examiner* — Chun Cao
*Assistant Examiner* — Ameir Myers
(74) *Attorney, Agent, or Firm* — Klarquist Sparkman, LLP

(57) ABSTRACT

Technologies are described for performing revision control for product masters within a database system. For example, a product master, comprising master data representing a product, can be received. The product master can be identified by a unique product identifier. A definition of a minor revision of the product master can also be received and stored in association with the product master. The definition of the minor revision can comprise: one or more revision attributes that are specific to the minor revision, one or more document objects that are specific to the minor revision, and/or an indication of a bill of material (BOM) version that is specific to the minor revision. A given product master can have multiple minor revisions, each with its associated attributes, documents, and BOM version.

15 Claims, 5 Drawing Sheets

REVISION CONTROL FOR PRODUCT MASTER DATA IN PRODUCT LIFECYCLE MANAGEMENT

BACKGROUND

Organizations that design, manufacture, or sell products need a way to manage those products. Product lifecycle management (PLM) is the process of managing a product's lifecycle from inception, through design and manufacturing, to sales, service, and eventually retirement. PLM solutions help an organization to develop new products and bring them to market. Enterprise resource planning (ERP) helps an organization run its processes for departments such as finance, manufacturing, human resources, supply chain, and others.

Organizations rely on master data for various types of business processes, including PLM processes and/or ERP processes. In particular, PLM solutions rely on master data describing products. In some solutions, when product master data is changed, a history of the change is not retained. In other words, product master data is changed directly without maintaining old versions of the product master data. Without knowing how product master data was changed, it can be difficult or impossible to reconstruct a product as it existed at a particular point in time (e.g., for a particular product release).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for performing revision control for product masters within a database system. The technologies can comprise receiving a product master, comprising master data representing a product, where the product master is identified by a unique product identifier. The technologies can comprise receiving a definition of a minor revision for the product master, where the minor revision is associated with a unique minor revision identifier, and where the definition of the minor revision comprises: one or more revision attributes that are specific to the minor revision, one or more document objects that are specific to the minor revision, and an indication of a bill of material (BOM) version that is specific to the minor revision. The technologies can comprise storing the definition of the minor revision in association with the product master. The product master can support multiple minor revisions within the database system.

DETAILED DESCRIPTION

Overview

Figure 1:
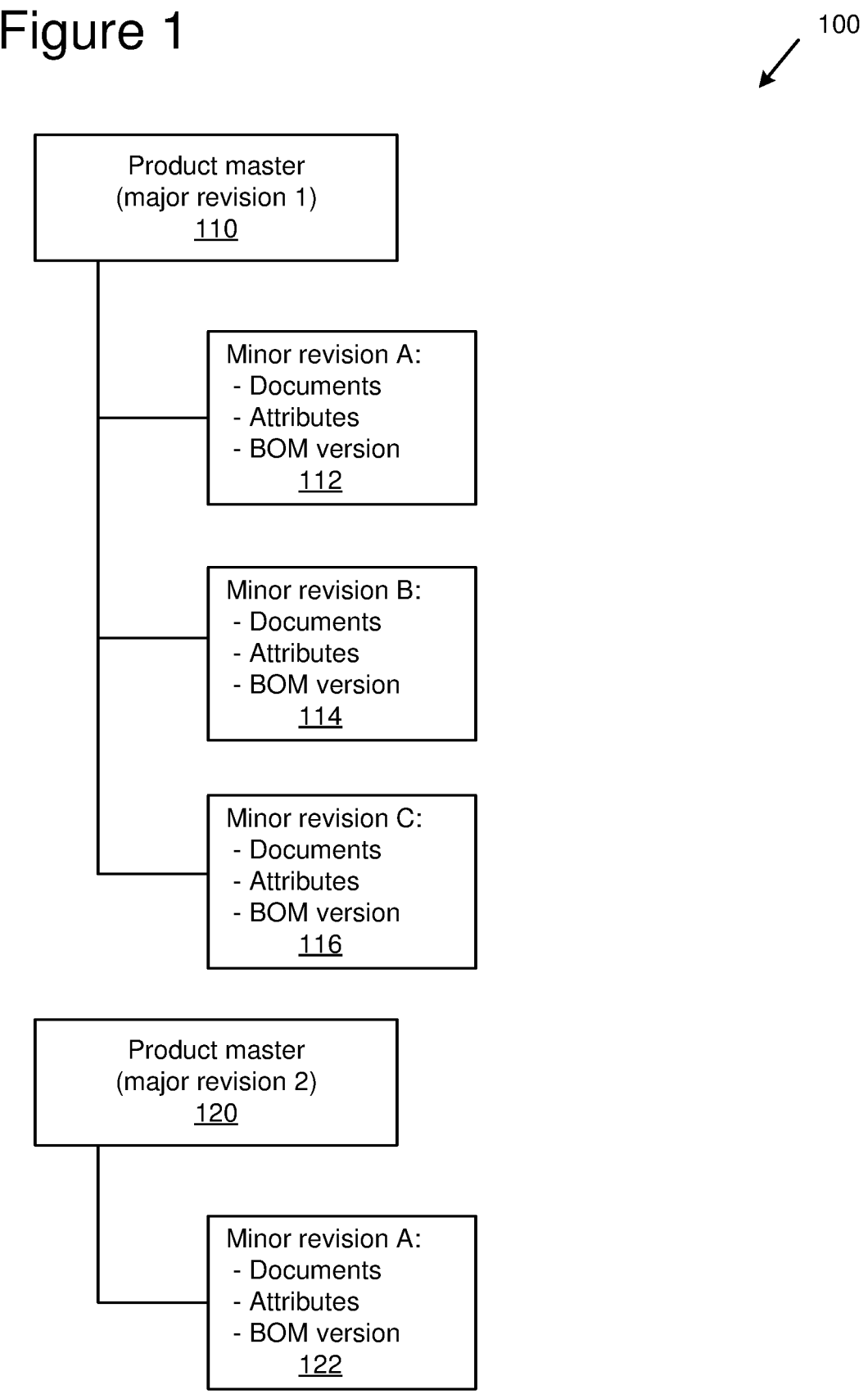
FIG. 1 is a diagram depicting example major and minor revisions for product masters.

The following description is directed to technologies for performing revision control for product masters within environments providing enterprise resource planning (ERP) and/or product lifecycle management (PLM) solutions. For example, a product master, comprising master data representing a product, can be received. The product master can be identified by a unique product identifier. A definition of a minor revision of the product master can also be received and stored in association with the product master. The definition of the minor revision can comprise: one or more revision attributes that are specific to the minor revision, one or more document objects that are specific to the minor revision, and/or an indication of a bill of material (BOM) version that is specific to the minor revision. A given product master can have multiple minor revisions, each with its associated attributes, documents, and BOM version.

In some existing solutions, change numbers are used to manage BOMs. Change numbers provide a way to indicate the time period when a given BOM is valid (e.g., for logistics processes). For example, a change number can indicate that a particular BOM becomes valid at a particular time (in on a specific date). However, change numbers do not provide revision control. Furthermore, change numbers cannot provide a "frozen" structure that specifies the product details (e.g., the minor revisions of each product master at each level of a product hierarchy) at a particular point based on changes to the products. For example, using change numbers does not allow an engineer to view a given product as it existed at the time of a particular release.

The technologies described herein provide improvements to such existing solutions (e.g., to solutions using change numbers). For example, the technologies described herein allow minor revisions to be maintained for product masters, where the minor revisions can indicate documents, attributes and/or a BOM versions that are specific to the minor revisions. In addition, a baseline can be maintained that stores information indicating the components, and their corresponding minor revisions, that are used for a given minor revisions of a given product master. Using the baselines associated with the minor revisions at each level of a product hierarchy, complete snapshot of a given product master can be generated.

Terminology

The term "master data" refers to data describing stable entities. In other words, master data is data defining the entities or objects that give context to activities performed by an organization. Typically, master data does not change frequently. Examples of master data include, but are not limited to, data representing products, customers, vendors, costs, assets, etc. Master data is different from transactional data (e.g., data that is generated by some action that is performed by an organization, such as generated by a sales order or invoice).

The term "product" or "material" refers to a tangible product, such as a sellable article, packaging, auxiliary material, or expendable supplies. An example of a product is a computer or a car. A product can also be made up of other products. For example, a car can be comprised of other products that are components of the car, such as an engine, a transmission, a chassis, etc., each of which can themselves be comprised of other products (e.g., resulting in a hierarchy of products).

The term "product master" (which is also referred to as "material master") refers to a product entity that is defined by product master data. Product master data is used to support planning, logistics, modeling, forecasting, and reporting in systems such as ERP systems.

The term "bill of material" or "BOM" refers to the different components (which are themselves products) that together create a product and their quantities. The BOM for a given product defines the explicit hierarchy for the given product. A BOM version provides a separate and dedicated representation of the different components of the BOM.

The term "baseline" refers to data indicating which product minor revisions and document versions are relevant for a particular product minor revision. The baseline is used when expanding the BOM to determine the relevant minor revisions for each component.

The term "major revision" refers to a revision that uses a new product master with a new unique product identifier (also referred to as a product number). For example, a first major revision of a product could have product identifier 7334, while a second major revision of the product could have product identifier 7335. Each major revision of the product would have its own product master data and be independent of the other major revisions of the product.

The term "minor revision" refers to a revision within a given product master, and a given product master can have a number of minor revisions. For example, minor revisions share the same product master for PLM. This means that a minor revision should not change the behavior of the product. In other words, a minor revision does not change the form, fit, and function of the product. For example, if the product is a multimedia system that fits in a car, then the product dimensions, interfaces, etc. will not change between minor revisions.

Example Major and Minor Revisions for Product Masters

FIG. 1 is a diagram 100 depicting example major and minor revisions for product masters. Specifically, there are two product masters depicted in FIG. 1. The first product master 110 is designated as major revision 1, and the second product master 120 is designated as major revision 2. For example, the first product master 110 could have a product ID of 4711V1 and the second product master 120 could have a product ID of 4711V2. While product master 110 and product master 120 could both be product masters representing different revisions of a similar product (e.g., two revisions of a specific engine for a vehicle), they are independent product masters with their own master data.

As depicted, each product master can have one or more minor revisions, each with its corresponding minor revision data. In this example, the first product master 110 has three minor revisions, minor revision A 112, minor revision B 114, and minor revision C 116. Each minor revision can be associated with a unique identifier. For example, minor revision A 112 can have a revision product ID of 4711V1-A, minor revision B 114 can have a revision product ID of 4711V1-B, and minor revision C 116 can have a revision product ID of 4711V1-C. Each minor revision can be associated with entities or objects specific to that minor revision. For example, minor revision A 112 can be associated with one or more document objects (also referred to as document attachments) that are specific to minor revision A 112. Example document objects include computer-aided design (CAD) documents, drawings, image files, documentation, specifications, and/or other types of data or files associated with the minor revision. The document objects can also include document metadata (e.g., version information, document description, file names or paths, etc.).

The entities or objects associated with a minor revision can include attributes. For example, minor revision A 112 can be associated with one or more attributes (also referred to as revision attributes) that are specific to minor revision A 112. Example attributes could include dimensions, weight, description, etc. In some implementations, the user selects (e.g., via a graphical user interface) the attributes that will be included as revision attributes for a given minor revision. For example, the user can select from a full set of possible attributes associated with the product master (e.g., with product master 110). The selected attributes can then be stored as revision attributes that are specific to the current minor revision (e.g., specific to minor revision A 112). This is also referred to as placing the selected attributes under revision control. The user can then select revision attributes for other minor revisions (e.g., for minor revision B 114 and/or for minor revision C 116) that can be the same revision attributes and/or different revision attributes than those selected for minor revision A 112.

The entities or objects associated with a minor revision can include BOM versions. For example, minor revision A 112 can be associated with a BOM version that is specific to minor revision A 112. The BOM version indicates the different components that make up the product master 110 for the specific minor revision A 112. In addition, the various components of the BOM version (which are themselves products) can be associated with a minor revision.

As depicted, there can be multiple other product masters (in addition to product master 110), one of which is product master 120. The other product masters can each have any number of minor revisions. For example, product master 120 has minor revision A 122. Each minor revision can be associated with entities or objects specific to that minor revision.

Example BOM Versions

Figure 2:
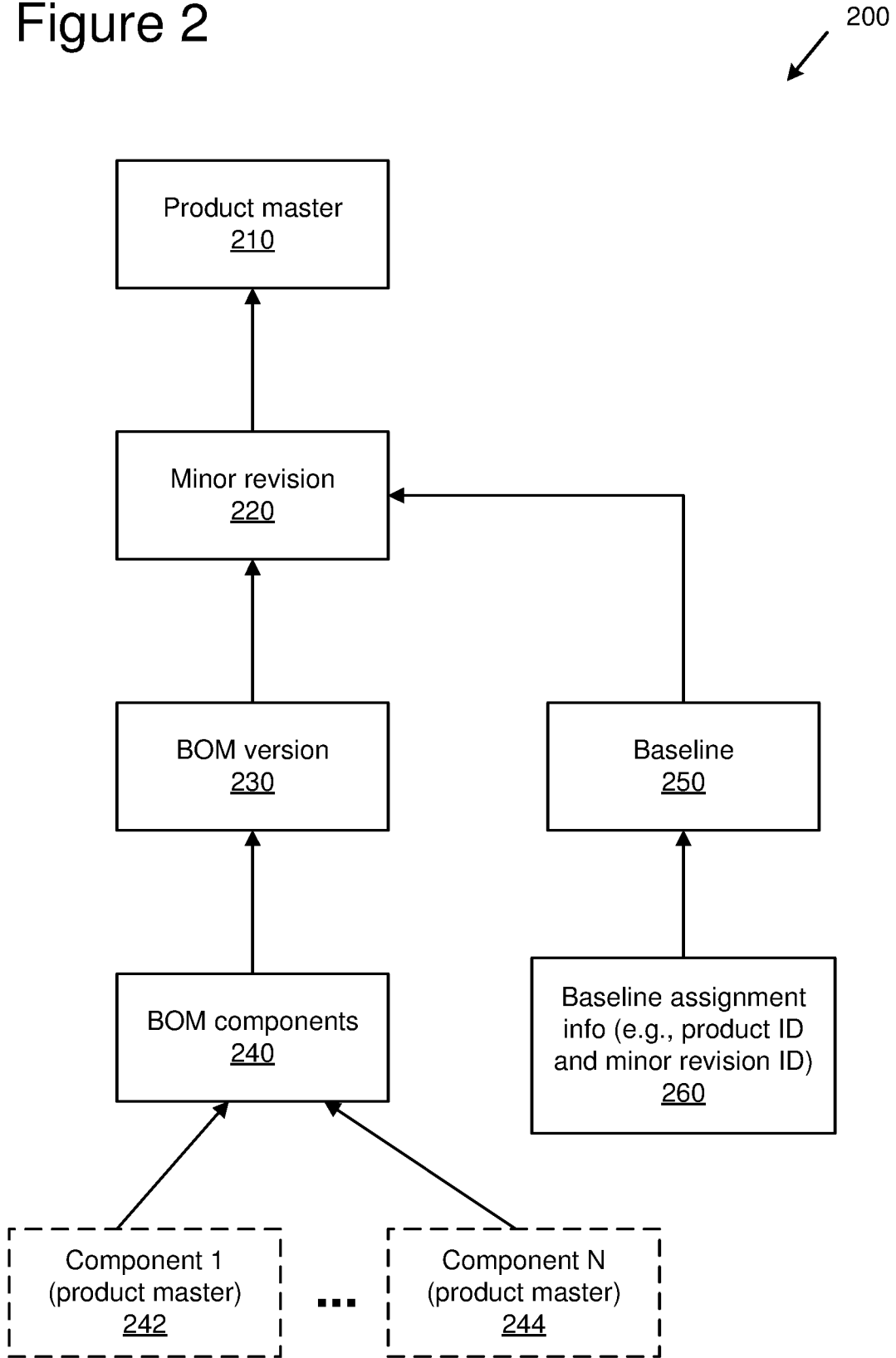
FIG. 2 is a diagram depicting an example minor revision, including baseline assignment information, for a product master.

FIG. 2 is a diagram 200 depicting an example minor revision, including baseline assignment information, for a product master 210. In some implementations, the product master 210 is associated with a major revision. For example, the product master 210 could be product master 110, product master 120, or a different product master. A minor revision 220 is associated with the product master 210. For example, if the product master 210 corresponds to product master 110, then the minor revision 220 could correspond to minor revision 112, 114, or 116.

The minor revision 220 is associated with a BOM version 230. The BOM version 230 is specific to the minor revision 220 and indicates the different components that make up the minor revision 220 of the product master 210. For example, the BOM version 230 can indicate one or more components (depicted generally as component 1 242 through component N 244). Each BOM component can itself be a product, and can be associated with various minor revisions, BOM version, and BOM components. For example, component 1 242 can be a product master (different from product master 210)

which itself has its associated minor revisions, BOM version, and BOM components. This hierarchy can continue down through any number of components and sub-components, which together represent all of the components that make up the minor revision 220 of the product master 210. While the BOM components 240 (e.g., component 1 242 through component N 244) are themselves product masters, the BOM components 240 do not indicate which minor revisions of the product masters will be used. Instead, the minor revision information is maintained in the baseline 250. In this way, the BOM for a given product master does not have to be updated when minor revisions of the BOM components are created or updated, or when minor revisions are created or updated at lower levels of the hierarchy. This approach also allows the BOM to be used by other processes (e.g., including consumers and customer logic) that utilize BOMs without having to modify the other processes (e.g., the other processes do not have to be modified to use minor revisions).

The baseline 250 maintains information (e.g., baseline assignment information 260) indicating which components, and their corresponding minor revisions, were used for minor revision 220 of the product master 210. The baseline 250 can comprise indications of the entities or objects (e.g., documents, attributes, etc.) specific to minor revision 220 of the product master 210. The baseline 250 can also comprise indications of the BOM components 240 of the BOM version 230 that are specific to the minor revision 220 of the product master 210 (e.g., indications of component 1 242 through component N 244). For the BOM components 240, the baseline 250 can store indications of which minor revisions of the BOM components 240 are associated with the minor revision 220.

The table below, Table 1, depicts example baseline assignment information 260 for the baseline 250. Specifically, Table 1 lists product identifiers (product ID) for the product masters. In this example, product ID 4711V1 corresponds to product master 210 and the minor revision 220 ID, which also corresponds to the BOM version 230, is 4711V1.02. Product IDs 8376, 98191V5, and 5321V2 are BOM components 240. For example, minor revision 8376.03 of product ID 8376 is a product master that is one of the BOM components 240.

TABLE 1

Example baseline assignment information

| Product ID | Minor revision ID | Object type |
|---|---|---|
| 8376 | 8376.03 | Product version |
| 98191V5 | 98191V5.01 | Product version |
| 5321V2 | 532V2.04 | Product version |
| 4711V1 | 4711V1.02 | BOM version |
| 4711V1 | 4711V1.02 | Document version |

Using a baseline, such as baseline 250, to maintain information indicating the components, and their corresponding minor revision, that are used for a given minor revision of a given product master provides advantages. For example, using a baseline can provide a "frozen" snapshot of a particular minor revision of a particular product master along with all of the components (identified by their corresponding minor revisions) that make up the particular minor revision of the particular product master. In this way, it is possible to "expand" the product master to include all of its components for the particular minor revision (e.g., by accessing the baseline assignment information corresponding to the BOM version at each level, and for each product master, of the product hierarchy).

Methods for Performing Revision Control for Product Masters

In the technologies described herein, methods can be provided for performing revision control for product masters. The methods can be performed within a PLM system and/or an ERP system. In some implementations, the revision control is performed using a database system (e.g., where the database system stores the product master information and the minor revision information). The example methods can be implemented using software and/or hardware resources. For example, the methods can be implemented by software running on computer servers, by database resources, by cloud computing resources, and/or using other computing resources.

Figure 3:
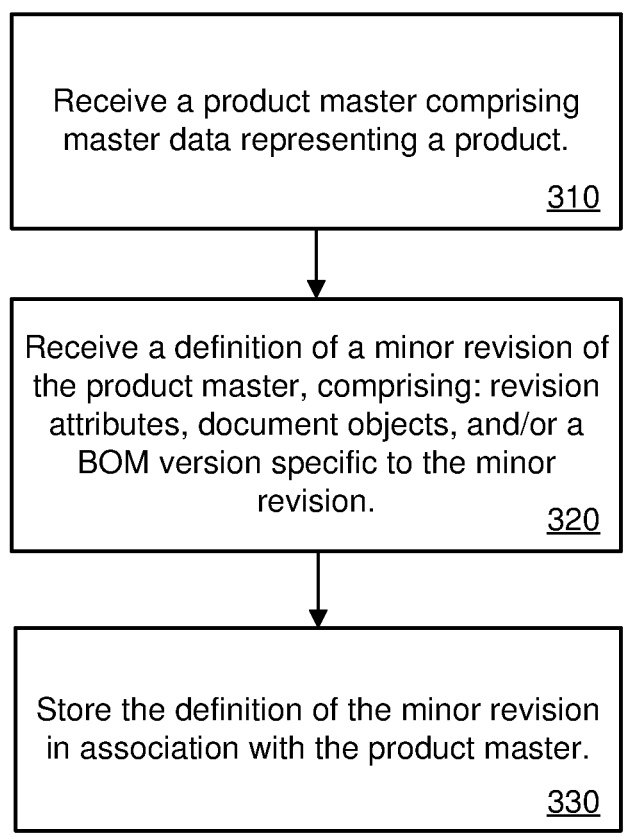
FIG. 3 is a flowchart of an example process for performing revision control for product masters.

FIG. 3 is a flowchart of an example process 300 for performing revision control for product masters. For example, the example process 300 can be performed within an environment providing ERP and/or PLM solutions.

At 310, a product master is received. The product master comprises master data representing a product. The product master can be identified by a unique product identifier. In some implementations, the product master is associated with a major revision. The product master is part of a hierarchy of products (a product hierarchy). For example, the product master can represent a product that is comprised of multiple other products (e.g., called sub-products), each of which is also a product master, and each of which can in turn be comprised of multiple other products.

At 320, a definition of a minor revision for the product master is received. The minor revision is associated with a unique minor revision identifier. The definition of the minor revision comprises one or more revision attributes that are specific to the minor revision, one or more document objects that are specific to the minor revision, and/or an indication of a bill of material (BOM) version that is specific to the minor revision. The product master can have multiple minor revisions. Each of the minor revisions is associated with its own minor revision definition comprising the attributes, documents and/or BOM version specific to that minor revision.

In some implementations, the definition of the minor revision comprises a baseline. The baseline includes baseline assignment information indicating minor revision information for one or more BOM components of the BOM version. This allows the minor revision information for the BOM components to be stored separately from the BOM version.

At 330, the definition of the minor revision is stored in association with the product master. For example, the definition of the minor revision can be stored in a database system and associated with the product master (e.g., using the unique product master identifier).

The minor revision of the product master can be used for various engineering, manufacturing, planning, and logistics purposes. For example, if a specific version of a product is released (e.g., to manufacturing), then the state of the specific version of the product can be maintained (e.g., based on the most recent minor revisions of the product master for the various levels of the product hierarchy).

Figure 4:
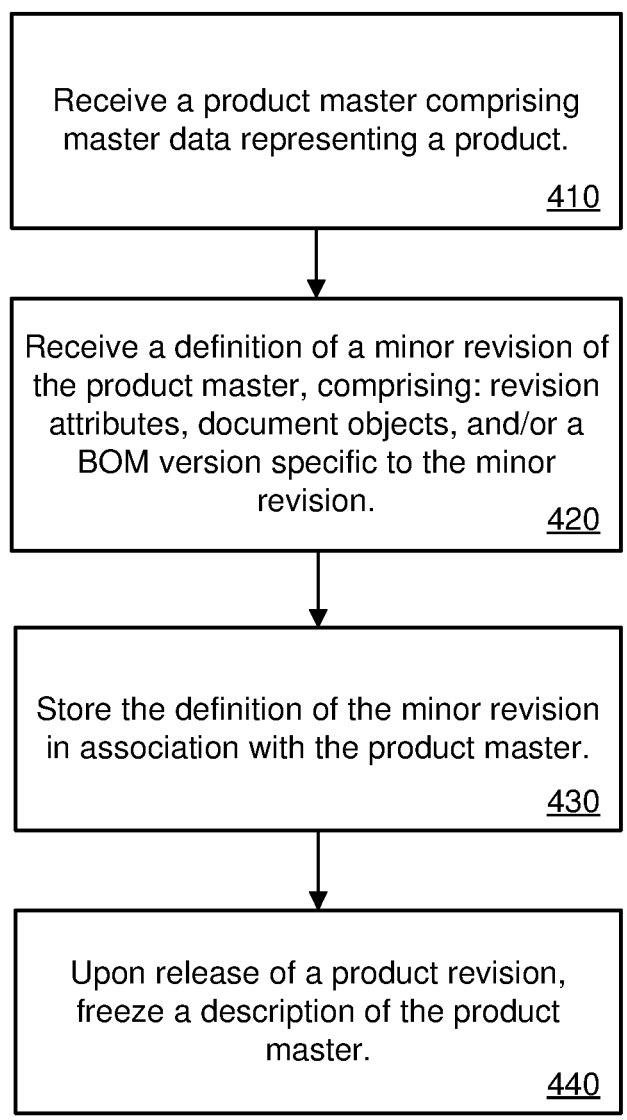
FIG. 4 is a flowchart of an example process for performing revision control for product masters, including freezing a description of the product master.

FIG. 4 is a flowchart of an example process 400 for performing revision control for product masters, including freezing a description of the product master. For example, the example process 400 can be performed within an environment providing ERP and/or PLM solutions.

At 410, a product master is received. The product master comprises master data representing a product. The product master can be identified by a unique product identifier. In some implementations, the product master is associated with a major revision. The product master is part of a hierarchy of products (a product hierarchy). For example, the product master can represent a product that is comprised of multiple other products (e.g., called sub-products), each of which is also a product master, and each of which can in turn be comprised of multiple other products.

At 420, a definition of a minor revision for the product master is received. The minor revision is associated with a unique minor revision identifier. The definition of the minor revision comprises one or more revision attributes that are specific to the minor revision, one or more document objects that are specific to the minor revision, and/or an indication of a bill of material (BOM) version that is specific to the minor revision. The product master can have multiple minor revisions. Each of the minor revisions is associated with its own minor revision definition comprising the attributes, documents and/or BOM version specific to that minor revision. In some implementations, the definition of the minor revision comprises a baseline. The baseline includes baseline assignment information indicating minor revision information for one or more BOM components of the BOM version. This allows the minor revision information for the BOM components to be stored separately from the BOM version.

At 430, the definition of the minor revision is stored in association with the product master. For example, the definition of the minor revision can be stored in a database system and associated with the product master (e.g., using the unique product master identifier).

At 440, a description of the product master is frozen upon release of a product revision. The frozen description of the product master comprises a read-only record of the definition of the minor revision (e.g., the revision attributes, document objects, and BOM version associated with the minor revision) along with definitions of minor revisions of product masters at lower product levels based on expansion of the BOM version. For example, if a particular minor revision of a product is released to manufacturing, then a read-only record of the minor revision can be maintained that includes the definition of the minor revision of the product master along with all lower level products that make up the product master (based on expansion of the BOM version of the minor revision of the product master). At each level of the product hierarchy, the minor revisions of the product masters at that level can be identified (e.g., based on the associated baselines) and their minor revision definitions added to the read-only record. The read-only record can be maintained as database data or in another format. The read-only record can be saved or reviewed (e.g., a user can display a specific released product and view its minor revision information for each level of the product hierarchy).

Computing Systems

Figure 5:
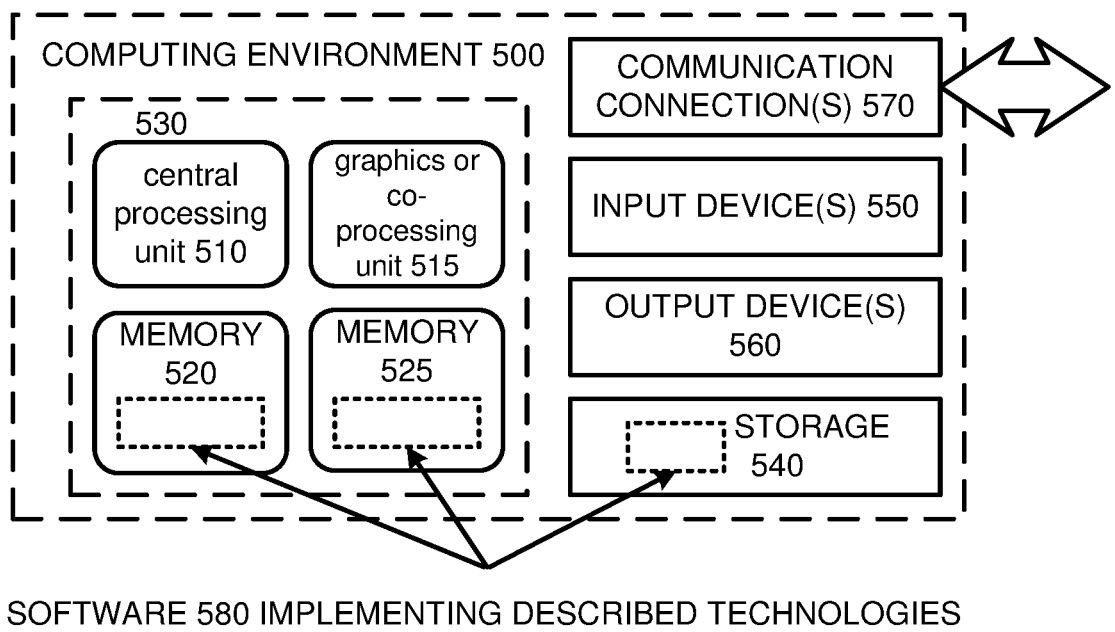
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 6:
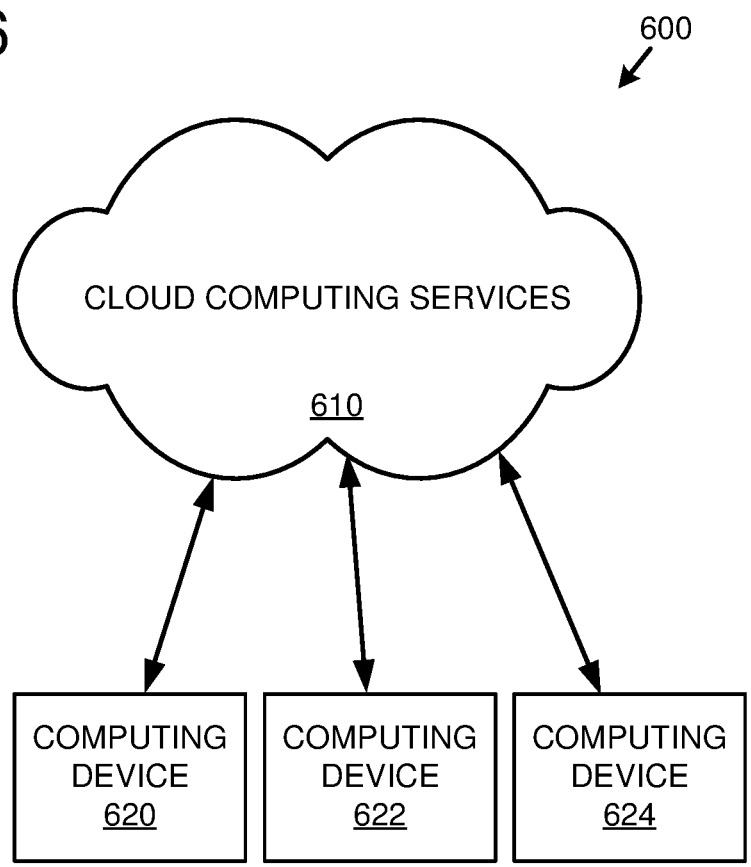
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, database resources, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections, such as 570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for performing revision control for product masters within a product lifecycle management system, the method comprising:
   receiving a product master, comprising master data representing a product, wherein the product master is identified by a unique product identifier;
   receiving a definition of a minor revision for the product master, wherein the minor revision is associated with a unique minor revision identifier, and wherein the definition of the minor revision comprises:
      one or more revision attributes that are specific to the minor revision;
      one or more document objects that are specific to the minor revision;
      an indication of a bill of material (BOM) version that is specific to the minor revision; and
      a baseline that comprises baseline assignment information, wherein the baseline assignment information indicates minor revision information for one or more BOM components of the BOM version;
   storing the definition of the minor revision in association with the product master in a database system, wherein the baseline is stored separately from the BOM version; and
   after releasing a product revision for the product master that includes the minor revision, generating a read-only record of the definition of the minor revision, wherein generating the read-only record comprises expanding the product master, comprising:
      for each product level of a product hierarchy beginning with the product master, outputting indications of BOM components, and their associated minor revisions, at the product level using baselines associated with the BOM components at the product level;
   wherein the product master supports multiple minor revisions within the product lifecycle management system, wherein the minor revision is a first minor revision and the BOM version is a first BOM version, the method further comprising:
   creating a second minor revision for the product master, wherein the second minor revision is partly defined by a second BOM version different from the first BOM version; and
   updating the baseline assignment information of the baseline to indicate minor revision information for one or more BOM components of the second BOM version, wherein the updating does not change the first BOM version.

2. The method of claim 1, further comprising:
   receiving, from a user, an indication of the one or more revision attributes to be placed under revision control for the minor revision, wherein the one or more revision attributes are selected from an available set of product attributes.

3. The method of claim 1, wherein the BOM version indicates one or more BOM components that are associated with the minor revision of the product master, wherein the one or more BOM components are one or more other product masters.

4. The method of claim 1, wherein the baseline assignment information specifies the unique product identifier and the unique minor revision identifier.

5. The method of claim 1, wherein the minor revision information for the one or more BOM components is stored in the baseline assignment information and not in the BOM version.

6. The method of claim 1, wherein the product master is part of a product hierarchy with a plurality of product levels, and wherein each product level comprises one or more product masters and one or more corresponding baselines.

7. The method of claim 1, further comprising:
   displaying, in a graphical user interface, an indication of the product master along with indications of the one or more revision attributes, the one or more document objects, and the BOM version that are specific to the minor revision.

8. One or more computing devices comprising:
   processors; and
   memory;
   the one or more computing devices configured, via computer-executable instructions stored in one or more non-transitory computer-readable storage media, to perform revision control for product masters within a product lifecycle management system, the operations comprising:
      receiving a product master, comprising master data representing a product, wherein the product master is identified by a unique product identifier;
      receiving a definition of a minor revision for the product master, wherein the minor revision is associated with a unique minor revision identifier, and wherein the definition of the minor revision comprises:
         one or more revision attributes that are specific to the minor revision;
         one or more document objects that are specific to the minor revision;
         an indication of a bill of material (BOM) version that is specific to the minor revision; and
         a baseline that comprises baseline assignment information, wherein the baseline assignment information indicates minor revision information for one or more BOM components of the BOM version;
      storing the definition of the minor revision in association with the product master in a database system, wherein the baseline is stored separately from the BOM version; and
      after releasing a product revision for the product master that includes the minor revision, generating a read-only record of the definition of the minor revision, wherein generating the read-only record comprises expanding the product master, comprising:
         for each product level of a product hierarchy beginning with the product master, outputting indications of BOM components, and their associated minor revisions, at the product level using baselines associated with the BOM components at the product level;
      wherein the product master supports multiple minor revisions within the product lifecycle management system, wherein the minor revision is a first minor revision and the BOM version is a first BOM version, the operations further comprising:
      creating a second minor revision for the product master, wherein the second minor revision is partly defined by a second BOM version different from the first BOM version; and
      updating the baseline assignment information of the baseline to indicate minor revision information for one or more BOM components of the second BOM version, wherein the updating does not change the first BOM version.

9. The one or more computing devices of claim 8, wherein the BOM version indicates one or more BOM components that are associated with the minor revision of the product master, wherein the one or more BOM components are one or more other product masters.

10. The one or more computing devices of claim 8, wherein the baseline assignment information specifies the unique product identifier and the unique minor revision identifier.

11. The one or more computing devices of claim 8, wherein the minor revision information for the one or more BOM components is stored in the baseline assignment information and not in the BOM version.

12. The one or more computing devices of claim 8, wherein the product master is part of a product hierarchy with a plurality of product levels, and wherein each product level comprises one or more product masters and one or more corresponding baselines.

13. One or more non-transitory computer-readable storage media storing computer-executable instructions for execution on one or more computing devices to perform operations for performing revision control for product masters within a product lifecycle management system, the operations comprising:
  receiving a product master, comprising master data representing a product, wherein the product master is identified by a unique product identifier, and wherein the product master is associated with a major revision;
  receiving a definition of a minor revision for the product master, wherein the minor revision is associated with a unique minor revision identifier, and wherein the definition of the minor revision comprises:
    one or more revision attributes that are specific to the minor revision;
    one or more document objects that are specific to the minor revision;
    an indication of a bill of material (BOM) version that is specific to the minor revision; and
    a baseline that comprises baseline assignment information, wherein the baseline assignment information indicates minor revision information for one or more BOM components of the BOM version;
  storing the definition of the minor revision in association with the product master in a database system, wherein the baseline is stored separately from the BOM version, wherein the minor revision is one of multiple minor revisions of the product master; and
  after releasing a product revision for the product master that includes the minor revision, generating a read-only record of the definition of the minor revision, wherein generating the read-only record comprises expanding the product master, comprising:
    for each product level of a product hierarchy beginning with the product master, outputting indications of BOM components, and their associated minor revisions, at the product level using baselines associated with the BOM components at the product level,
  wherein the minor revision is a first minor revision and the BOM version is a first BOM version, the operations further comprising:
  creating a second minor revision for the product master, wherein the second minor revision is partly defined by a second BOM version different from the first BOM version; and
  updating the baseline assignment information of the baseline to indicate minor revision information for one or more BOM components of the second BOM version, wherein the updating does not change the first BOM version.

14. The one or more non-transitory computer-readable storage media of claim 13, the operations further comprising:
  outputting, for display to a user, the read-only record.

15. The one or more non-transitory computer-readable storage media of claim 13, wherein the product master is part of a product hierarchy with a plurality of product levels, and wherein each product level comprises one or more product masters and one or more corresponding baselines.

* * * * *